US007369057B2

(12) United States Patent
Twerdochlib et al.

(10) Patent No.: US 7,369,057 B2
(45) Date of Patent: May 6, 2008

(54) POWER GENERATOR AND POWER GENERATOR AUXILIARY MONITORING

(75) Inventors: Michael Twerdochlib, Oviedo, FL (US); David Bateman, Geneva, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 211 days.

(21) Appl. No.: 11/197,242

(22) Filed: Aug. 4, 2005

(65) Prior Publication Data

US 2007/0063859 A1 Mar. 22, 2007

(51) Int. Cl.

| | |
|---|---|
| ***G08B 17/00*** | (2006.01) |
| ***G08B 21/00*** | (2006.01) |
| ***G01K 1/08*** | (2006.01) |
| ***G01T 1/24*** | (2006.01) |
| ***G01T 1/18*** | (2006.01) |

(52) U.S. Cl. ...................... 340/679; 340/584; 340/628; 340/629; 340/630; 340/631; 340/632; 374/141; 374/142; 374/145; 374/147; 374/152; 250/370.01; 250/370.02; 250/374

(58) Field of Classification Search ................ 340/584, 340/628–632, 679; 250/370.01, 370.02, 250/374; 374/141–152

See application file for complete search history.

(56) References Cited

U.S. PATENT DOCUMENTS

| | | | | |
|---|---|---|---|---|
| 3,427,880 A | | 2/1969 | Grobel et al. | |
| 3,573,460 A | | 4/1971 | Skala | |
| 3,915,570 A | * | 10/1975 | Skala | 356/73 |
| 3,972,225 A | | 8/1976 | Fort et al. | |
| 4,080,535 A | | 3/1978 | Phillips et al. | |
| 4,082,952 A | | 4/1978 | Depoitier et al. | |
| 4,121,458 A | * | 10/1978 | Fort | 250/382 |
| 4,157,040 A | | 6/1979 | Barton et al. | |
| 4,698,756 A | * | 10/1987 | Gonzalez et al. | 702/130 |
| 4,818,975 A | * | 4/1989 | Jenkins | 340/584 |
| 5,105,081 A | | 4/1992 | Kelley | |
| 5,456,102 A | * | 10/1995 | Moorehead | 73/1.24 |
| 5,550,629 A | * | 8/1996 | Shapanus et al. | 356/72 |
| 6,175,111 B1 | | 1/2001 | Sorita et al. | |

(Continued)

OTHER PUBLICATIONS

"From Complex . . . to E-PLEX"; [online]; [retrieved on February 18, 2005]; 1 Page; Retrieved from http://www.edd-inc.com/eplex1.htm; ED&D, Inc. Oviedo, FL.

(Continued)

*Primary Examiner*—Benjamin C. Lee
*Assistant Examiner*—Lam Pham

(57) ABSTRACT

A generator monitoring system and method includes a plurality of sensors (12) disposed within a generator enclosure (18) to sense health conditions of a generator (10) housed within the enclosure. The sensors are interconnected to provide a single communication path (14) for allowing communication with the plurality of sensors. A monitoring device (16) outside the generator enclosure receives health condition information from each of the plurality of sensors via the single communication path. A sensor may be disposed within the generator enclosure to detect particulates emitted from a monitored portion (e.g., 52) of the generator housed within the enclosure. A sensor may be disposed proximate a bus bar connection (130) of the generator to sense a health condition of the bus bar connection and generate corresponding health condition information provided to the monitoring device.

17 Claims, 4 Drawing Sheets

U.S. PATENT DOCUMENTS

| | | | | |
|---|---|---|---|---|
| 6,456,095 | B1 | 9/2002 | Sorita et al. | |
| 6,513,972 | B1 * | 2/2003 | Jenkins | 374/161 |
| 6,527,440 | B1 * | 3/2003 | Jenkins | 374/161 |
| 6,821,748 | B1 * | 11/2004 | Jaffe | 435/32 |
| 6,998,618 | B2 * | 2/2006 | Twerdochlib | 250/370.02 |
| 2004/0059523 | A1 | 3/2004 | Lau et al. | |
| 2004/0100270 | A1 | 5/2004 | Fischer et al. | |

OTHER PUBLICATIONS

"GCM-A"; Generator Overheat Monitoring: Air-Cooled Monitoring: GCM-A; [online]; [retrieved on Feb. 18, 2005]; Pages 1-3; Retrieved from http://www.eone.com/detection/heatmonitoring/aircooledmonitoring/gcma/content.html; Environment One Corporation, Niskayuna, NY.

"Generator Condition Monitor-Explosion-Proof Design"; [online]; [retrieved on Feb. 18, 2005]; pp. 1-4; Retrieved from www.eone.com; Environment One Corporation, Niskayuna, NY.

"Generator Condition Monitor for Air-Cooled Apparatus"; [online]; [retrieved on Feb. 18, 2005]; pp. 1-5; Retrieved from www.eone.com Environment One Corporation, Niskayuna, NY.

"Generator Gas Analyzer"; [online]; [retrieved on Feb. 18, 2005]; pp. 1-6; Retrieved from www.eone.com; Environment One Corporation, Niskayuna, NY.

"Generator Gas Analyzer (GGA) Generator Gas Monitoring: GGA"; [online]; [retrieved on Feb. 18, 2005]; pp. 1-3; retrieved from http://www.eone.com/detection/gasmonitoring/gga/content.html; Environment One Corporation, Niskayuna, NY.

* cited by examiner

POWER GENERATOR AND POWER GENERATOR AUXILIARY MONITORING

FIELD OF THE INVENTION

This invention relates generally to power generators, and, in particular, to monitoring conditions of the power generator and bus bar connections of the generator.

BACKGROUND OF THE INVENTION

Large power generators are monitored to detect health conditions of the generator to identify failures that may need to be remedied before the condition causes damage to the generator that may require considerable downtime to repair. For example, a generator part having an abnormally high temperature may be indicative of an incipient failure of the part. Thermocouples mounted at strategic locations on the generator have been used to monitor certain parts of the generator to detect abnormal temperatures. For example, generator stator bars may be cooled by internal channels conducting cooled pressurized hydrogen or water therethrough. Failures in a bar may be detected by monitoring a temperature differential of the pressurized hydrogen or water entering and exiting a channel, such as by disposing a thermocouple at the inlet and outlet of the channel.

Monitoring conditions of such generators may be complicated by the need to enclose the cooled generator within gas tight hermetic enclosures, such as in the case of hydrogen cooled generators. Complex particulate sensors, such as generator condition monitors (GCM) available from Environment One Corporation, mounted outside generator enclosures have been used to extract gas samples from within the enclosure to detect particulates within the gas indicative of a generator component experiencing abnormally high heating. For applications on air cooled generators, such systems typically include blower, vacuum pumps, switching valves, humidification system water supplies and filtering system and tend to be expensive and difficult to maintain.

BRIEF DESCRIPTION OF THE DRAWINGS

The invention will be more apparent from the following description in view of the drawings that show.

DETAILED DESCRIPTION OF THE INVENTION

One of the challenges of monitoring generators and generator busses (in particular, hydrogen cooled generators housed in gas tight, hermetic enclosures) is the need to penetrate the enclosure with a communication link, such as wire or fiber optic, to provide communication with sensors disposed within the enclosure. However, each enclosure penetration may become a source of a sealing failure of the enclosure. Furthermore, the need to have numerous detectors mounted at strategic location relative to the generator may require routing of many separate wires throughout the generator and providing enclosure penetrations for each of the wires. For example, in a typical generator application, 24 to 48 wires connected to thermocouples must be routed through the generator and passed through the enclosure to a monitoring system outside the generator. The monitoring system must process each of the signals received from the thermocouples to determine if a failure condition of the generator is indicated relative to a location of the thermocouple. Monitoring of particulates in a cooling fluid flowing around an enclosed generator to determine presence of an overheating condition has proven to be expensive to implement. For example, multi-port collection systems that transport fluid samples to a single monitor, such as GCM system, typically blend the fluid samples together and thus require a highly sensitive detection system due to the dilution of the samples as a result of blending. The inventors of the present invention have developed an innovative monitoring system that overcomes these and other problems associated with conventional generator monitoring systems.

Figure 1:
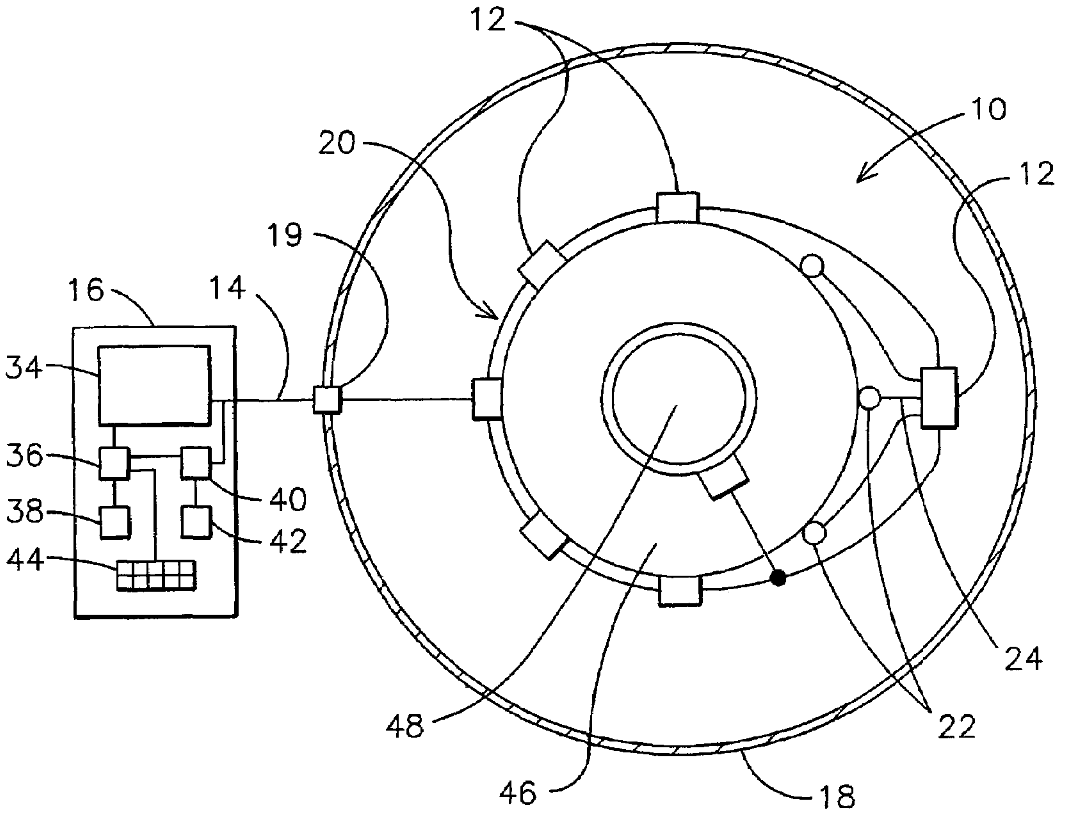
FIG. 1 is a schematic cross sectional view of a power generator including a plurality of sensors having a single communication path to a monitoring device.

FIG. 1 is a schematic cross sectional view of a power generator 10 including a plurality of sensors 12 having a single communication path 14 to a monitoring device 16. One or more sensors 12 may be disposed within a generator enclosure 18 to sense a plurality of health conditions of the 10 generator housed within the enclosure 18. In a hydrogen cooled embodiment, the enclosure 18 may include a cylindrical shape, while in the case of an air cooled generator, the enclosure 18 may include a "house" shape. The plurality of sensors 12 may be positioned at certain locations, such as spaced around stator end turns 46, to monitor a condition of the generator 10 near the location. The sensors 12 may be interconnected to provide the single communication path 14 for allowing communication with the plurality of sensors 12. The monitoring device 16 may reside outside the generator enclosure 18 and receives health condition information from each of the plurality of sensors 12 via the single communication path 14 through a single penetration 19 of the enclosure 18.

The single communication path 14 may include a bus architecture interconnecting each of the sensors 12 that provides power and communication capability. For example, an E-plex compatible two wire bus architecture available from ED & D, Incorporated, may be used to provide communications and power to the sensors 12. The sensors 12 may be configured as separately addressable nodes on a bus 20 so that information, such as sensor data and module status, on the bus 20 intended for a specific sensor 12 may be identified by the sensor's address, and information and data being provided by the sensor 12 to the bus 20 may be source identified by the sensor's address. Using such a bus architecture, it is believed that as many as one thousand sensors 12 may be attached to the bus 20 while still providing the single communication path 14 through, for example, a single penetration 54 of the enclosure 18.

Figure 2:
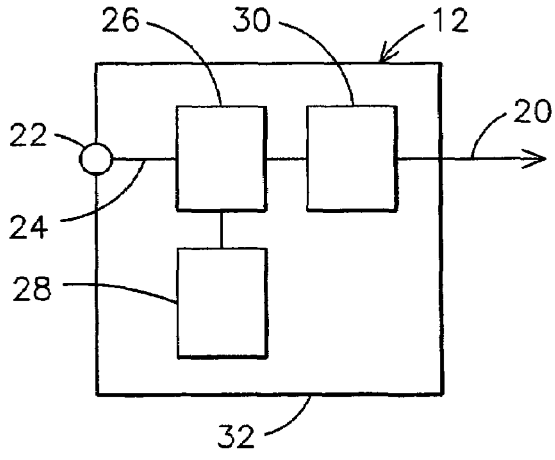
FIG. 2 is a block diagram of an exemplary sensor.

In an aspect of the invention shown in FIG. 2, the sensor 20 may include a detector 22 generating a signal 24 responsive to a health condition of the generator 10. For example, the detector 22 may include a thermocouple, responsive to a temperature of generator cooling gas or water discharge, or a component proximate the thermocouple, generating a voltage signal responsive to the temperature. Other detectors may include an ion current detector for detecting particulates, an acoustic detector for detecting abnormal sound levels, a radio frequency detector for detecting abnormal RF pulses (e.g., arcing and/or partial discharge), an infrared radiation detector for detecting heat emissions, or an ozone detector for detecting arcing.

In an aspect of the invention, each sensor 12 may include a processor 26 processing the signal 24 received from the detector 22 to generate health condition information based on the signal 24. For example, the processor 26 may include an analog to digital converter that converts the analog value of temperature to a digital representation for bus 20 transmission. The processor 26 may be configured for evaluating a voltage signal provided by a thermocouple to determine if the voltage exceeds a predetermined level, such as may be stored in a look-up-table in memory 28, indicative of an abnormal health condition of a monitored portion or component of the generator 10. Information generated by the processor 26, such as health condition information, may be stored in a memory 28 for later retrieval and/or may be provided to a transmitter 30 for making the information available on a bus 20 and accessible by the monitoring device 16 shown in FIG. 1.

In an aspect of the invention, a sensor 12 including an IR detector may be positioned near the rotor 48 and synchronized with the rotor's revolution for sensing heat emissions of components, such as connector bars or end rings of the rotor 48. For example, sensors 12 used for monitoring connector bars may provide raw, or relatively unprocessed, data to the monitoring device 16 which then processes the raw data from each of the sensors monitoring the connector bar temperature over time to detect relatively small temperature changes in a single stator bar. For example, data from each of the individual sensors 12 may need to be analyzed over a sufficiently long period of time because such bars may have a relatively large and variable common temperature changing pattern which needs to be removed to detect a relatively small effect of a bar temperature condition indicative of failure. In this case, the monitoring device 16 may need more processing power than if the monitoring device 16 were used to simply display information indicative of data processed individually by the respective sensors 12.

The processor 26 of the sensor 12 may provide all the heath condition information to the monitoring device 16 via the bus 20, or may limit the health information provided, such as by limiting the heath information to information indicative of an abnormal condition, such as a failure condition. Information may be processed at the sensor 12 to reduce an amount of information needed to be provided to the external monitoring device 16 to indicate abnormal health condition. For example, the sensor 12 may filter acquired data, perform self testing and providing status of the sensor 12, and provide an alarm signal based on processed data. In one embodiment, the sensor 12 may process the signal 24 to simply provide an alarm signal to notify the monitoring device 16 that a failure condition has occurred. Accordingly, the monitoring device 16 acts as simple display device. In applications such as stator bar temperature monitoring and generator cooling air monitoring, for example, of particulates suspended in the cooling air, each sensor 12 may preprocess the information before sensing it to the monitoring device 12 for display.

Advantageously, an amount of information needed to be transmitted from the respective sensors 12 may be substantially reduced, since only preprocessed information need be sent back, there is no as well as reducing processing requirement on the monitoring device 16 because preprocessing is performed locally at the sensor 12. In another aspect of the invention, the transmitter 30 may also be configured as a transceiver to receive information from the bus 20, such as sensor programming information, operating programs, and testing instructions issued by the monitoring device 16.

In another aspect of the invention, the task of processing data gathered by each sensor 12 may be shifted to the monitoring device 16, instead of the sensor 12 performing the processing task locally, so that the monitoring device 16 acts as a data processor and display device. For example, in the case of monitoring stator bar cooling hydrogen or cooling water, temperatures provided by each of the sensors 12 monitoring these conditions may need to be accumulated, such as in the monitoring device 16, to determine a temperature deviation from a mean temperature of the accumulated temperatures. Accordingly, relatively small temperature changes that may be indicative of a failure condition may be sensed sooner than if each temperature from each sensor 12 is monitored separately.

The components of the sensor 12 may be contained within a single housing 32 (for example, a molded plastic housing) positioned within the generator enclosure 18 proximate a portion or component of the generator 10, or a bus bar extending form the generator 10, desired to be monitored. It is believed that sensors 12 may be configured to fit in housing 32 about the size of match box, allowing the sensors 12 to be positioned near portions of the generator having limited space or access. In another aspect depicted in FIG. 1, one or more detectors 22 may be mounted remotely from the housing 32. Signals 24 from the respective detectors 22 may be fed back to the processor 26 of the sensor 12. For example, one or more detectors 22 may be positioned within a cooling channel of a stator bar remote from the housing 32.

The monitoring device 16 of FIG. 1 may provide an indication of the health condition of the generator 10 based on health condition information received from the plurality of sensors 12 with the enclosure 18, such as a respective health condition of each component being monitored. For example, the monitoring device 16 may include a simple indicator 34, such as visual indicator (LED, flashing light, etc.) and/or an audio indicator (bell, buzzer, verbal cue, etc.), to notify an operator of a health condition needing attention. The indicator 34 may include a video display screen, such as a touch screen, for interactively displaying the health information, for example, received from each of sensors 12. The indicator 34 may include indicia indicative of an overall health of the system, or respective indicial corresponding to each of the sensor used for monitoring the generator 10 and related equipment such as a generator bus bar. The monitoring device 16 may simply display information received from each of the sensors 12. For example, in the case of stator bar temperature monitoring, the indicator 34 of the monitoring device 16 may include the stator bar status, temperatures for each sensor 12, status of each of the sensors 12, an initialization screen, and a status of a the bus 20. Analysis involving accumulated data from each of the sensors 12 may be performed in the monitoring device 16, or the data gathered form each sensor 12 may be simply displayed at the monitoring device 16 and then forwarded to a power plant operation computer (not shown) for processing.

The monitoring device 16 may include processor 36 in communication with a memory 38. The monitoring device 16 may also include a transceiver 40, such as bus controller, for communication with the plurality of sensors 12 disposed inside the enclosure 18 via the single communication path 14. The processor 36 may process received data, such as health condition information, to provide an appropriate indication to an operator via the indicator 34. The transceiver 40 may also provide power to sensors 12 on the bus 20 from a bus power supply 42, for example, using a power modulation technique according to the E-plex bus architecture. An I/O device 44, such as a keyboard, may be provided to operate the monitoring device 16 and remotely program the sensors 12. In an aspect of the invention, the I/O device may be incorporated into the indicator 34 such as by using a touch screen type display for the indicator 34. The monitoring device 16 may be in communication with a plant computer such as via a network, such as the Internet, for remote access and viewing.

Figure 3:
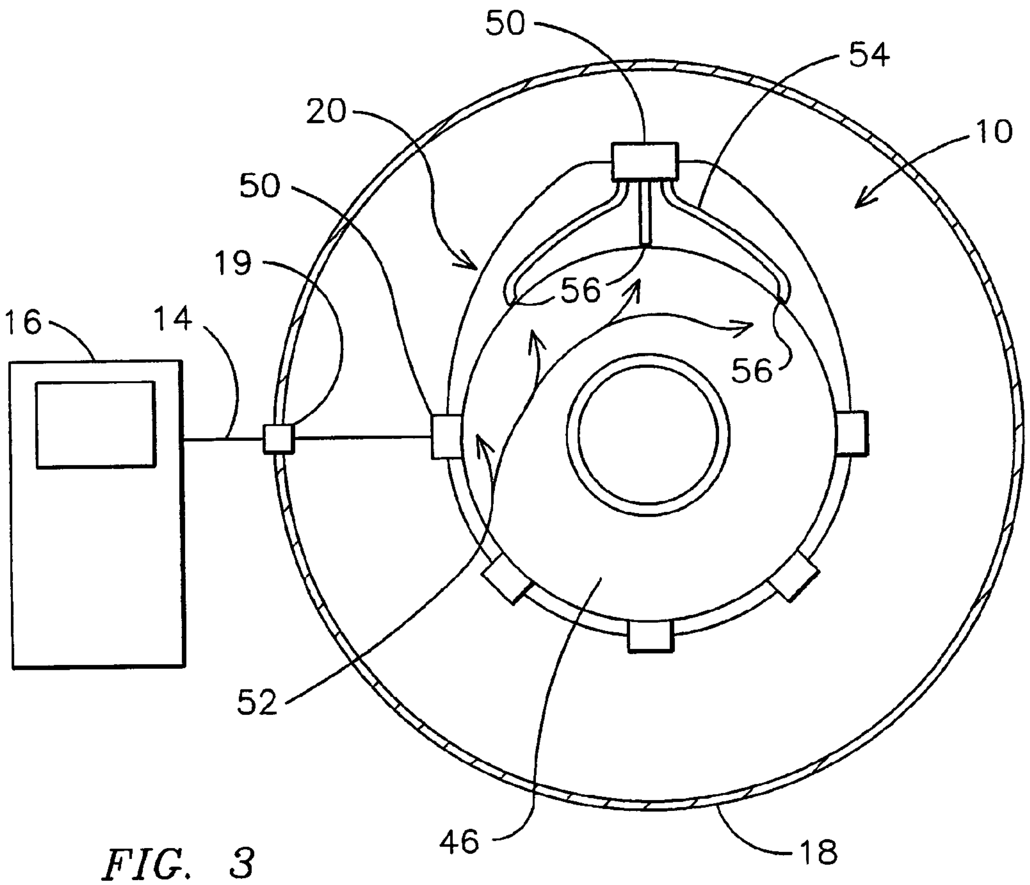
FIG. 3 is a schematic cross sectional view of a power generator including a particulate sensor disposed within a generator enclosure.

In another aspect of the invention shown in FIG. 3, the sensor 12 as shown in FIG. 2 may be configured as one or more particulate sensing devices 50 disposed within an generator enclosure 18, such as an air cooled generator, to detect particulates emitted from respective monitored portions 52 of the generator 10 housed within the enclosure 16 to detect an overheating condition. Each of the particulate sensing devices 50 may be configured as shown in FIG. 2, wherein the detector 22 includes an ion detector, such as is commonly used in a household smoke detector. The detector 22 detects particulates in a sample of a fluid, such as air flowing into the sensing device 50 from a portion 52 of the generator 10. The particulate sensing device 50 may include processor 26 receiving the signal 24 from the detector 22 indicative of particulate concentration in a fluid sample. The processor 26 may then provide, via the transmitter 30, health information, responsive to the signal 24, to the monitoring device 16 disposed outside the generator enclosure 18 over the bus 20. The monitoring device 16 may then provide an indication of a detected particulate concentration detected by the sensor 22. In an aspect of the invention, the particulate sensing device 50 may also include a fluid sampler, such as one of the fluid sampler embodiments depicted in FIGS. 4-6, used to provide fluid samples to the detector 22. Accordingly, the processor 26 may control and monitor operation of the fluid sampler. The particulate sensing devices 50 may be connected to the 20 bus, such as described earlier, to provide a single connection 14 to the monitoring device 16.

Unlike prior particulate detection systems, by placing the particulate sensors 50 at known locations within the enclosure 18 and proximate portions 52 of a generator 10 desired to be monitored, the portion 52, or component located at the monitored portion 52, of the generator 10 producing a particulate emission may be specifically identified. For example, by correlating the particulate information acquired to a location of the acquiring sensor 50, the specific portion 52 of the generator 10 experiencing heating may be determined. In an embodiment of the invention, the sensor 50 may include a collector 54 comprising a plurality of inlet points 56 disposed proximate a corresponding plurality of different portions 52 of the generator 10 for collecting respective fluid samples and delivering the samples to the sensor 50, so that the sensor 50 may monitor two or more different portions 52 of the generator 10. Compared to known sampling systems that require relatively sensitive particulate detectors because of dilution of sampling air, relatively inexpensive, less sensitive detectors 22 may be used while still providing sufficient sensitive to detect overheating conditions.

Figure 4:
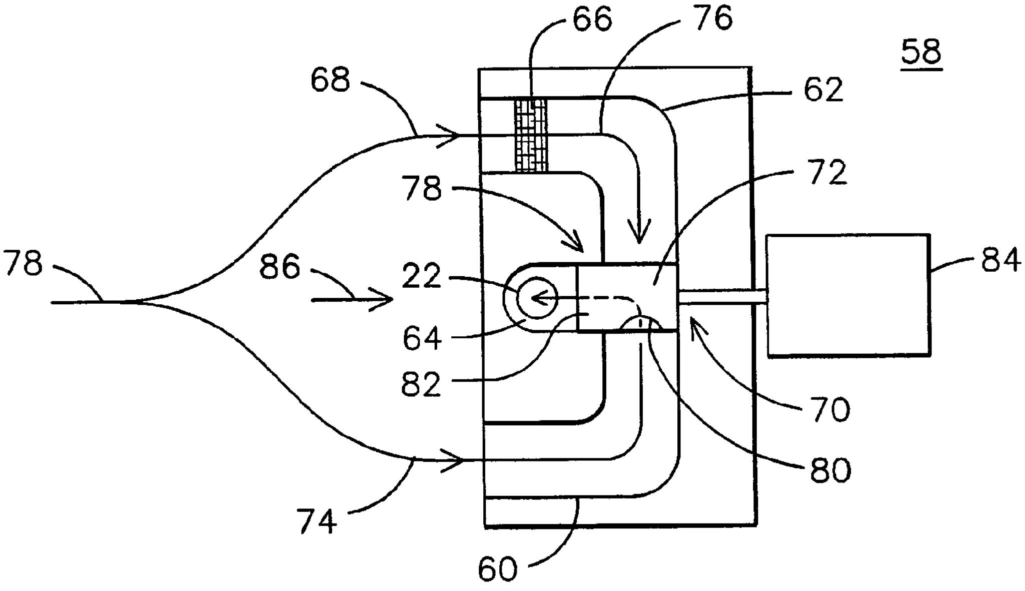
FIG. 4 is a schematic cross sectional view of an exemplary embodiment of a sampler for a particulate sensor.
Figure 5:
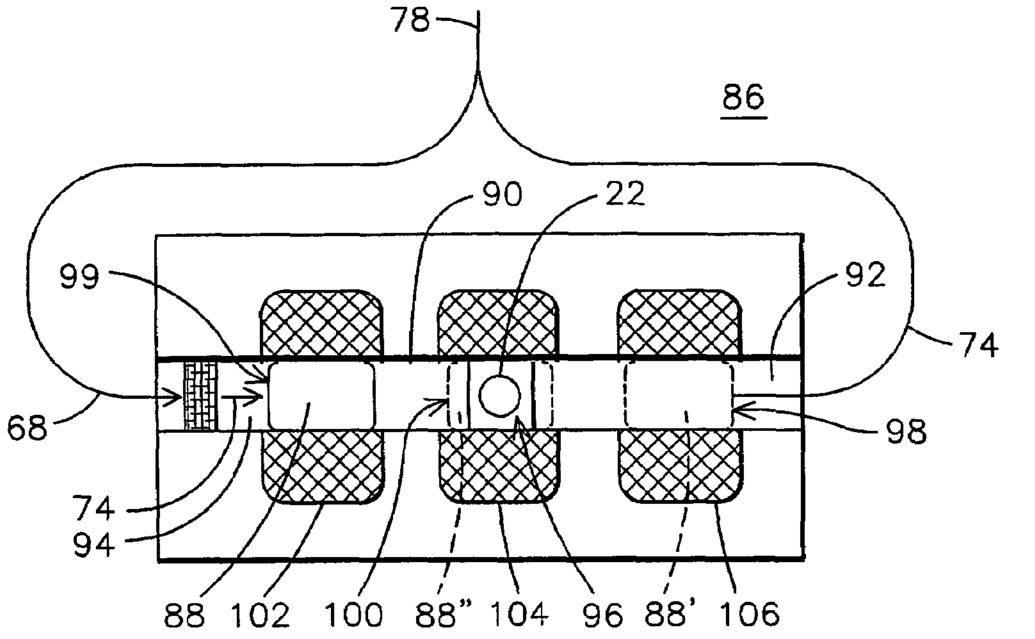
FIG. 5 is a schematic cross sectional view of an exemplary embodiment of a sampler for a particulate sensor.
Figure 6:
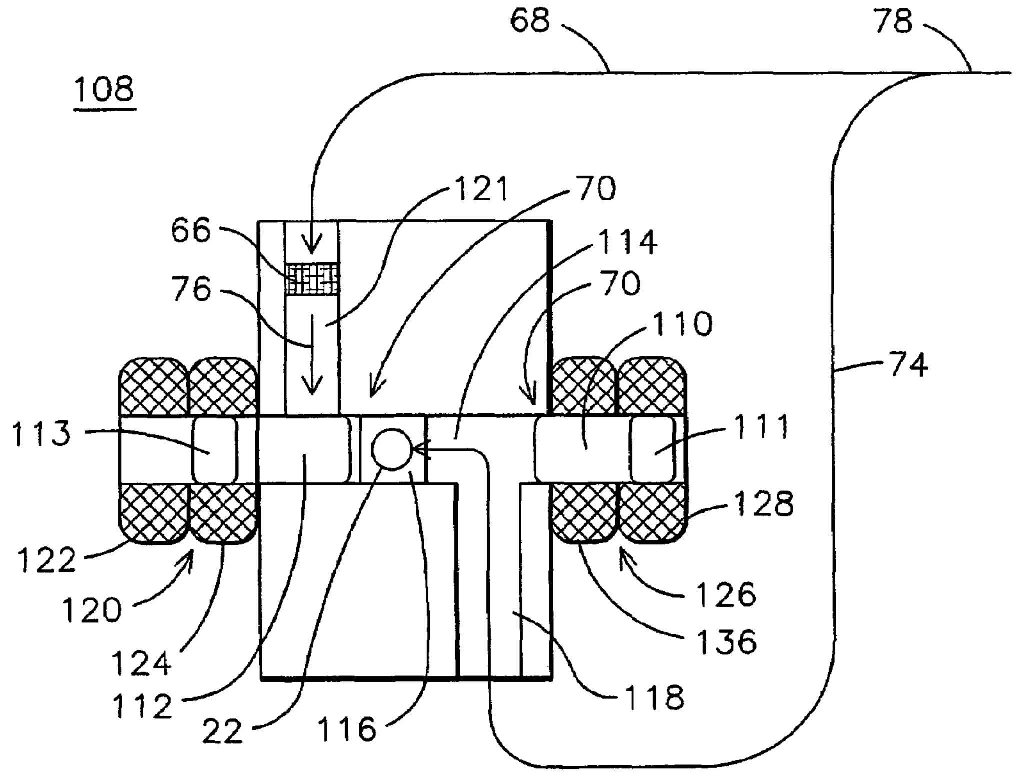
FIG. 6 is a schematic cross sectional view of an exemplary embodiment of a sampler for a particulate sensor.

In yet another embodiment, the detector 22 of the sensor 50 may be in communication with a fluid sampler, such as one of the fluid sampler embodiments depicted in FIGS. 4-6. The fluid sampler 58 shown in FIG. 4 may include a first flow path 60 conducting a first portion 74 of a fluid 78 and a second flow path 62 conducting a second portion 68 of the fluid 78 in communication with the detector 22 positioned in communication with a detection chamber 64. The detector 22 may be contained in a housing 12 and mounted below the detection chamber 64. The second flow path 62 may include a filter 66 for filtering the second portion 68 of the fluid 78 passing therethrough. A flow controller 70, such as a rotatable hollow cylindrical plug 72, is operable to selectively allow the first portion 74 of the fluid 78 and a filtered portion 76 of the fluid 78 to flow through respective flow paths 60, 62 to the detector 22 in the chamber 64. The cylindrical plug 72 may include an orifice 80 positioned in a quadrant of the plug 72 to allow a fluid to flow into the orifice 80 and out of an end 82 of the plug 72. The plug 72 may be rotated so that the orifice 80 aligns with one or the other flow paths 60, 62 to selectively conduct either the first portion 74 or the filtered portion 76 to the detector 22, or rotated to block a flow of either portion 74, 76. The rotation of the plug 72 may driven by a motor 84, such as by a shaft encoded motor coupled to a gear reduction mechanism (not shown) to drive the plug 72. In an embodiment, the motor 84 may be controlled by the processor 26 of FIG. 2 to move and confirm, such as optically, the position of the plug 72. Motor power may be sourced from the bus 20.

The positioning of the plug 72 may be described using a clock notation looking in the direction indicated by arrow 86. Accordingly, a 12:00 position of the plug 72 indicates the orifice 80 is directed upward (perpendicularly outward from the page of FIG. 4), a 3:00 position indicates the orifice 80 is oriented to direct the first portion 74 into the chamber 64 for particulate measurement, and a 9:00 position indicates the orifice 80 is oriented to direct the filtered portion 76 into the chamber 64 for particulate measurement. A sequence for measuring a fluid sample for particulates and comparing a particulate measurement to a filtered sample to verify a particulate measurement may include is:

1. Positioning plug to 3:00 (chamber 64 receives unfiltered sample, e.g. first portion 74)
2. Positioning plug to 12:00 (chamber 64 is sealed, particulate measurement is made by sensor 50)
3. Positioning plug to 3:00 (chamber 64 receives a new sample)
4. Positioning plug to 12:00 (chamber 64 is sealed, particulate measurement is made by sensor 50)
5. High particulate level is measured
6. Positioning plug to 9:00 (chamber 64 receives filtered sample, e.g. filtered portion 76)
7. Positioning plug to 12:00 (chamber 64 is sealed, particulate measurement is made by sensor 50)
8. If no particulate is detected, high particulate level verified, alarm is issued
9. Positioning plug to 3:00 (chamber 64 receives a new sample)
10. Positioning plug to 12:00 (chamber 64 is sealed, particulate measurement is made by sensor 50)

In another aspect of the invention, a flow monitoring device (not shown) may be disposed in the second flow path 62, such as downstream of the filter 66, for measuring an amount of the second portion 68 of the fluid 78 passing through the filter 66 to allow determining if the filter 66 is becoming clogged. For example, a downstream measured amount of flow of the second portion 68 may be compared to an upstream amount of flow of the second portion 68 measured by a second flow monitoring device disposed in the second flow path 62 upstream of the filter 66 to determine if the filter 66 is prohibitively restricting the flow of the second portion 68 flowing therethrough. In another aspect, a particulate producing element, such as a heating element, may be disposed in the fluid 78 upstream of the fluid sampler 58 to selectively introduce particulates into the fluid 78, for example, to test the operation of the fluid sampler 58 and detector 22 in detecting particulates.

In another embodiment depicted in FIG. 5, a fluid sampler 86 may include an impulse valving arrangement wherein a fluid flow is controlled by a flow controller 70 such as a cylindrical plug 88 positioned within a cylindrical channel 90 comprising a first flow path 92 and a second flow path 94 in communication with the detector 22 positioned in a detection chamber 96. The second flow path 92 may include a filter 66 for filtering a fluid passing therethrough. The plug 88 may be formed from a material, such as a ferrous material, responsive to an electromagnetic field, selectively formed for example, by an electromagnetic coil. The plug 88 may be translated by an electromagnetic force within the cylindrical channel 90 to selectively seal the first flow path 92 (position 98 indicated by dotted line depiction of plug 88'), the second flow path 92 (position 99 indicated by plug 88), or the chamber 96 (position 100 indicated by dotted line depiction of plug 88"), respectively.

The plug 88 may by moved by selectively energizing left end coil 102, center coil 104, and right end coil 106, by applying a magnetic force to translate the plug 88. For example, by energizing the center coil 104, the plug 88 moves to position 100 to seal the chamber 96 to measure a particulate level of a sample directed into the chamber 96. The left end coil 102 is energized to move the plug 88 to position 99 to allow a first portion 74 of the fluid 78 to be sampled to flow to the chamber 96, while the right end coil 106 is energized to move the plug 88 to position 98 to allow a filtered portion 76 of a second portion 68 of the fluid 78 to flow to the chamber 96. The coils 102, 104, 106 may be controlled by the processor 26 of FIG. 2 to move and confirm the position of the plug 88. Coil power may be sourced from the bus 20. Power may be stored in capacitor (not shown) to provide impulse power to the coils 102, 104, 106 so that the coils 102, 104, 106 may be sequentially pulsed to move the plug 88. A response of a coil 102, 104, 106 to a power pulse may be monitored, for example by processor 26 and used to verify that the plug 88 has moved to a desired position. A sequence for measuring a sample for particulates and comparing a particulate measurement to a filtered sample to verify a particulate measurement may include:

1. Energize Right Coil 106 to position plug at position 98 (chamber 96 receives unfiltered sample, e.g. first portion 74)
2. Energize Center Coil 104 to position plug 88 at position 100 (chamber 96 is sealed, particulate measurement is made)
3. Energize Right Coil 106 to position plug 88 at position 98 (chamber 96 receives new unfiltered sample)
4. Energize Center Coil 104 to position plug 88 at position 100 (chamber 96 is sealed, particulate measurement is made)
5. High particular level is measured
5. Energize Left Coil 102 to position plug 88 at position 99 (chamber 96 receives filtered sample, e.g. filtered portion 76)
6. Energize Center Coil 104 to position plug 88 at position 100 (chamber 96 is sealed, particulate measurement is made.
8. No particulate is detected, high particular level is verified, alarm is issued
7. Energize Right Coil 106 to position plug 88 at position 98 (chamber receives new unfiltered sample)
8. Energize Center Coil 104 to position plug 88 at position 100 (chamber 96 is sealed, particulate measurement is made).

In another embodiment depicted in FIG. 6, a fluid sampler 108 may include an impulse valving arrangement wherein a flow controller 70 includes two cylindrical plugs, 110, 112 positioned within a cylindrical channel 114 comprising a first flow path 118 and a second flow path 121. Each of the flow paths 118, 121 of the channel 114 are in communication with the detector 22 positioned in a detection chamber 116. The first flow path conducts the first portion 74 of the fluid flow 78 to the chamber 116 in communication with channel 114. The second flow path 121 may include a filter 66 for filtering the second portion 68 of the fluid 78 passing therethrough. The plugs 110, 112 include portions 111, 113, such as ferrous material portions, responsive to a magnetic field induced by respective coils pairs 120, 126. Each coil pair 120, 126 includes an outboard coil 122, 128 and an inboard coil 124, 130, respectively, to position the plugs 110, 112 in the channel 114 on respective sides of the chamber 116. Each plug 110, 112 can be independently moved by the respective coil pairs 120, 126 within the channel 114 to seal the chamber 116 (as indicated, for example, by the position of plug 112) and to allow a fluid to flow along the respective flow paths 118, 121 into the chamber 116 (as indicated, for example, by the position of plug 110). Power may be stored in capacitor (not shown) to provide impulse power to the coils 122, 128, 124, 130 so that the coils 122, 128, 124, 130 may be sequentially pulsed to move the plugs 110, 112. A response of a coil 122, 128, 124, 130 to a power pulse may be monitored, for example by processor 26 and used to verify that the plugs 110, 112 have moved to a desired position. A sequence for measuring a sample for particulates and comparing a particulate measurement to a filtered sample to verify a particulate measurement may include:

1. Energize outboard coil 128 to position plug 110 to allow first portion 74 to flow to chamber 116 (chamber 116 receives unfiltered sample)
2. Energize inboard 130 and outboard coil 128 to move plug 110 in an inboard direction
3. Energize inboard coil 130 to position plug 110 to seal chamber 116 (chamber 116 is sealed, particulate measurement is made)
4. Energize inboard 130 and outboard coil 128 to move plug 110 in an outboard direction
5. Energize outboard coil 128 to position plug 110 to allow second portion 74 to flow to chamber 116 (chamber 116 receives new unfiltered sample)

Steps 1-5 are repeated until a particulate is measured in step 3. If a particulate level in excess of a certain threshold is measured in step 3, plug 110 is not moved from its position after step 3 (unfiltered sample flow is blocked), and the inboard coil 124 and outboard coil 122 controlling plug 112 are operated per steps 1-3 as described above to measure a filtered sample. If no particulate condition is found in the filtered fluid sample, a particulate alarm may be issued. The coils 122, 124, 128, 130 may be controlled by the processor 26 of FIG. 2 to move and confirm the position of the plugs 110, 112. Coil power may be sourced from the bus 20. The above steps may also include energizing both inboard coil 124 and outboard coil 122 between individual coil firings to affect smoother plug movement.

The sensors 12 as described above may be applied to iso-phase busses that transfer electrical energy from the generator to a step-up transformer that may be located more than 100 feet from the generator. In power generator installations, bus bars connecting the generator to a power grid and bus bar connections between sections of the bus bars are typically enclosed by a bus bar enclosure 132 prohibiting easy access for inspection. Typically, a bus bar connection 130 may include a plurality of flexible conducting straps 136 connecting internal bus bar conductors 134 together. Contact areas 138 between the straps 136 and the bus bar 134 may become compromised, such as by corrosion or loosening of a connection between the bus bar 134 and the strap 136 due to thermal cycling, resulting in heating of the connection 130 due to an increased contact resistance. The inventors have innovatively realized the resulting heating may be monitored and analyzed to detect a health of the connection 130, such as by using an infrared radiation detecting sensor 12 positioned for receiving infrared radiation from the connection 130.

Figure 7:
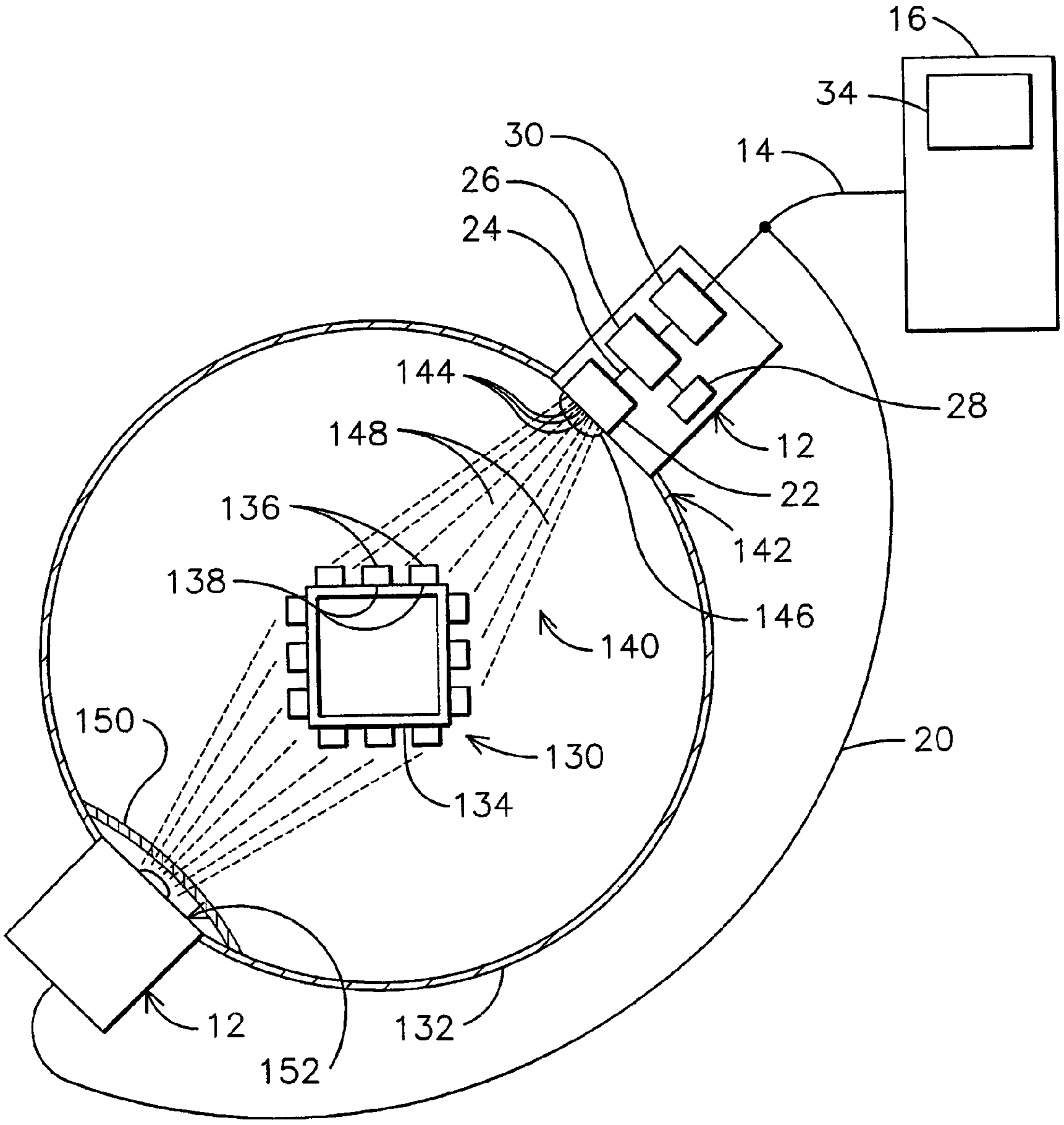
FIG. 7 is a schematic cross sectional view of a bus bar connection including a sensor for monitoring the connection.

As shown in the cross sectional view of FIG. 7, one or more sensors 12, such as the sensor 12 shown in FIG. 2, may be disposed proximate a bus bar connection 130 of a bus bar 134 of a generator to monitor a health condition of the bus bar connection 130. Each sensor 20 may include a detector 22, such as infrared radiation detector receiving an infrared radiation emission 140 from the bus bar connection 130 and generating a signal 24 responsive to a health condition of the bus bar connection 130. The sensor 20 may include a processor 26 for processing the signal 24 received from the detector 22 to generate health condition information based on the signal 24. The health condition information may be provided to a monitoring device 16 for displaying heath condition information. In an aspect of the invention, one or more sensors 12 may be connected to a bus 20 having a single communication path 14 to a monitoring device 16 for monitoring the conditions of the bus bar connection 130. In aspect of the invention, the sensor 12 may be disposed on the bus bar enclosure 132, such as by forming a hole in the enclosure to allow the detector 22 to receive the radiation emission 140 emitted from the connection 130 and attaching the sensor 12 to an external surface 142 of the enclosure 132. A conducting wire mesh 150 may be installed over an opening 152 in the bus bar enclosure 132 to reduce electrical radiation, while still allowing infrared radiation to reach the detector 22.

To monitor each of the respective straps 136 comprising the connection 130, the infrared detector 22 may include a plurality of sensing zones 144, each zone 144 configured to receive infrared radiation emitted from a respective connector strap 136 (or straps) comprising the bus bar connection 130. For example, a lens 146, such as a fresnel lens, may be used to focus a respective infrared radiation emission 148 from each of the respective connector straps 136 to the corresponding sensing zone 144 of the infrared detector 22. In an exemplary embodiment, two or more sensors 12 are disposed on the bus bar enclosure 132 to ensure the each of the straps 136 can be viewed by the sensors 12. Differences in temperature between respective straps 136, or groups of straps 136, may be analyzed, for example by processor 26, to remove temperature differences common to all of the straps 136. In other embodiments, the sensor 12 may include a detector for sensing a radio frequency emission, an ozone level, an acoustic emission, and/or an ultraviolet emission from the bus bar connection 130. In a noise reduction aspect of the invention, respective infrared emissions from a plurality of connector straps 136 of the bus bar connection 130 may be sensed, and the sensed values of the respective infrared emissions may be normalized with respect to sensed values common among the respective infrared emissions, so that non-common differences among the straps 136, such as one strap 136 experiencing more heating than the others, may be highlighted.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. A generator monitoring system comprising:

a plurality of sensors disposed within a generator enclosure to sense a plurality of health conditions of a generator housed within the enclosure and serially interconnected via a bus architecture to provide a single communication path for allowing communication with the plurality of sensors, wherein the single communication path is configured for providing a reduced number of conductors compared to a number of conductors that would be required if the sensors were wired in parallel; and a monitoring device disposed outside the generator enclosure receiving health condition information from each of the plurality of sensors via the single communication path.

2. The system of claim 1, wherein at least one of the plurality of sensors comprises:

a detector generating a signal responsive to a health condition of the generator; and a processor disposed within the enclosure processing the signal to generate health condition information.

3. The system of claim 2, further comprising a memory disposed within the enclosure in communication with the processor for storing the health condition information.

4. The system of claim 2, further comprising a transmitter disposed within the enclosure in communication with the processor for transmitting the health condition information to the monitoring device via the single communication path.

5. The system of claim 2, wherein the detector comprises an ion detector, an acoustic detector, a radio frequency detector, an ozone detector, or a temperature detector.

6. The system of claim 1, wherein the sensors limit the respective health information provided to the monitoring device.

7. The system of claim 1, wherein the sensors limit the respective health information to health information indicative of a failure condition.

8. The system of claim 1, wherein the sensors provide health information when requested by the monitoring device.

9. A generator comprising the system of claim 1.

10. A generator monitoring method comprising:

serially interconnecting a plurality of sensors disposed within a generator enclosure for detecting a plurality of health conditions of a generator housed within the enclosure so that a single communication path is provided for allowing communication with the plurality of sensors, wherein the single communication path is configured for providing a reduced number of conductors compared to a number of conductors that would be required if the sensors were wired in parallel; and providing a connection thru the enclosure for the single communication path to a monitoring device outside the generator enclosure.

11. A generator monitor comprising:

a sensor disposed within a generator enclosure to detect particulates emitted from a monitored portion of a generator housed within the enclosure due to overheating, the sensor further comprising:

a fluid sampler comprising a first flow path and a second flow path having a filter disposed therein in communication with the ion detector, and a flow controller for selectively allowing an unfiltered sample and a filtered sample of a fluid to flow through respective flow paths to the ion detector to detect particulate concentration indicative of overheating by comparing filtered and unfiltered ion detections; and a monitoring device outside the generator enclosure receiving the detected particulate concentration and providing an indication of a generator overheating condition.

12. The monitor of claim 11, wherein the sensor comprises an ion detector generating a signal indicative of a particulate concentration.

13. The monitor of claim 11, wherein the monitor comprises a collector comprising a plurality of inlet points disposed proximate a corresponding plurality of different portions of the generator for collecting respective fluid samples and delivering the samples to the sensor.

14. A generator comprising the monitor of claim 11.

15. A generator monitoring method comprising:

disposing a particulate sensor within a generator enclosure proximate a portion of a generator housed within the enclosure being monitored for overheating;

providing an unfiltered sample of a fluid disposed proximate the portion of the generator to the sensor;

providing a filtered sample of the fluid disposed proximate the portion of the generator to the sensor;

generating, at the sensor, information responsive to a particulate emission indicative of overheating of the portion of the generator being monitored by comparing filtered and unfiltered sample sensor outputs; and providing the information to a monitoring device outside of the generator enclosure.

16. The method of claim 15, further comprising correlating the particulate information to a location of the sensor to determine the portion of the generator experiencing heating.

17. The method of claim 15, further comprising determining when a particulate concentration of the unfiltered sample is higher than a particulate concentration of the filtered sample.

* * * * *